United States Patent
Nagl et al.

(10) Patent No.: US 7,226,883 B1
(45) Date of Patent: Jun. 5, 2007

(54) OXIDIZER AND OXIDATION PROCESS FOR A DESULPHURIZATION PROCESS

(75) Inventors: Gary J. Nagl, Deer Park, IL (US); Myron Reicher, Arlington Heights, IL (US); Derek McManus, Goodyear, AZ (US)

(73) Assignee: Merichem Chemicals & Refinery Services LLC, Houston, TX (US)

( * ) Notice: Subject to any disclaimer, the term of this patent is extended or adjusted under 35 U.S.C. 154(b) by 0 days.

(21) Appl. No.: 11/446,696

(22) Filed: Jun. 5, 2006
(Under 37 CFR 1.47)

(51) Int. Cl.
*B01J 38/00* (2006.01)
*B01J 38/12* (2006.01)
*B01J 38/40* (2006.01)
*C01B 17/04* (2006.01)

(52) U.S. Cl. .................. 502/38; 502/39; 423/576.4; 423/576.5; 423/576.6

(58) Field of Classification Search ............. 502/38, 502/39; 423/576.4, 576.5, 576.6
See application file for complete search history.

(56) References Cited

U.S. PATENT DOCUMENTS

| 4,455,236 | A | | 6/1984 | Kim |
| 4,622,212 | A | | 11/1986 | McManus et al. |
| 4,859,437 | A | * | 8/1989 | Grinstead .................. 423/226 |
| 6,083,472 | A | | 7/2000 | Nagl et al. |
| 6,589,498 | B1 | * | 7/2003 | Barrere-Tricca et al. . 423/573.1 |

OTHER PUBLICATIONS

Emil Raymond Riegel "Industrial Chemistry" 5th Ed., (1949) by Reinhold Publishing Corp. 430 Park Avenue, New York, New York, p. 131.*

* cited by examiner

*Primary Examiner*—Timothy C. Vanoy
(74) *Attorney, Agent, or Firm*—McDonnell Boehnen Hulbert & Berghoff LLP

(57) ABSTRACT

An improved oxidizer for liquid reduction-oxidation desulphurization processes uses a hollow fiber membrane contactor. A pressurized, oxygen containing gas stream is introduced into the interior of the hollow fiber membrane while a liquid reduction-oxidation catalyst solution contacts the exterior of the membrane. Oxygen diffuses through the membrane into the liquid reduction-oxidation catalyst solution whereby the solution is oxidized and can be recycled for further us in a desulphurization process.

3 Claims, 2 Drawing Sheets

OXIDIZER AND OXIDATION PROCESS FOR A DESULPHURIZATION PROCESS

FIELD OF THE INVENTION

This invention relates to an improved oxidizer for use in processes that treat sour gas streams containing hydrogen sulfide. Specifically, the gas-liquid oxidizer uses a hollow fiber membrane to allow an oxygen containing gas to contact a liquid reduction-oxidation ("redox") catalyst solution at high mass transfer rates. Our invention produces mass transfer rates up to 100 times greater than previously observed, thus reducing equipment costs, reducing the amount of excess oxygen needed to complete the oxidation of the redox catalyst and improving overall process economics.

BACKGROUND OF THE INVENTION

Hydrogen sulfide is a major source of pollution of gas streams since it is liberated as a waste by-product in a number of chemical processes, such as sulfate or kraft paper pulp manufacture, viscose manufacture, sewage treatment, the production of organic sulfur compounds, as well as during petroleum refining and in the production of natural gas and combustible gases from coal, such as in coking operations. Hydrogen sulfide is also present in geothermal steam, which is captured for use in power generating plants.

To eliminate these polluting sulfur gases the art has developed several oxidation-reduction ("redox") processes that use an aqueous chelated metal catalyst solution for removing hydrogen sulfide from a gas stream. In those prior art processes a hydrogen sulfide-containing gas, known as "sour gas," is contacted with a chelated metal catalyst to effect absorption. Subsequent oxidation of the hydrogen sulfide to elemental sulfur and concurrent reduction of the metal to a lower oxidation state also occurs. The catalyst solution is then regenerated for reuse by contacting it with an oxygen-containing gas to oxidize the metal back to a higher oxidation state. The elemental sulfur is continuously removed from the process as a solid product with high purity. Illustrative, but not exclusive, of these oxidation-reduction processes is the description contained in U.S. Pat. No. 4,622,212 (McManus et al.) and the references cited therein.

In order to return the "spent" liquid redox catalyst solution to its original oxidation level so it can be recycled for subsequent use in the process, oxygen must be supplied to the spent redox catalyst solution. This is typically accomplished using various mechanical apparatus, including well known tank spargers that use compressed air as the source of oxygen. A problem with these prior art air spargers is that they require large volumes of excess air due to the inherently low mass transfer rates of the oxygen into the redox catalyst solution. Higher excess air results in higher equipment and utility costs, thus reducing the overall process economics.

Up until now, the art has failed to come up with an apparatus and/or method of increasing the mass transfer rates of oxygen into the redox catalyst solution. Our invention solves this problem by utilizing membrane technology where an oxygen containing gas, typically air, diffuses through the membrane walls and forms extremely small bubbles of gas in the redox catalyst solution, thus significantly increasing the mass transfer rates and minimizing the amount of excess air needed to regenerate the redox spent catalyst solution. Such an apparatus and associated process represents an extremely economical method of regenerating the catalyst, and consequently, minimizing capital and operating costs. These and other advantages will become evident from the following more detailed description of the invention.

SUMMARY OF THE INVENTION

This invention relates to an improved oxidizer for use in regenerating a liquid redox catalyst and its use in processes that treat hydrogen sulfide containing gas streams. The improved oxidizer contains a bundle of hollow fiber membrane having extremely small pore sizes. Although the exact pore size is not critical to our invention, the membrane must be one that allows air or other oxygen containing gas to diffuse through the pores in the membrane wall. Although any oxygen containing gas can be used in this invention, the most commonly known and most available, air, will be referred to below for the sake of brevity. The hollow fiber bundle resembles a collection of very small tubes with a hollow interior. Unique to our oxidizer is not only the use of hollow fiber membranes, but that the bundle of fibers is adjustably supported within the oxidizer housing. The adjustable support allows a user to change the tension applied to the fiber bundle. We have found that it is desirable to not have the fiber bundle pulled taut because sulfur particles that enter the oxidizer with the liquid redox catalyst solution can become entrained in the fiber bundle, thus reducing liquid flow within and around the fibers. This leads to low air mass transfer rates and, in the extreme situation, to plugging of the oxidizer. To overcome this problem, we require that the oxidizer have an adjustment means to support the fiber bundle such that the flow of liquid redox solution causes the fibers to easily move relative to one another. This movement or undulation of the fibers prevents the sulfur particles from sticking, bridging, and/or adhering to the fibers and allows for intimate contact between the solution and the fibers. As will be explained in more detail below, reducing the tension in the fiber bundle is accomplished by allowing one or both ends of the fiber bundle to be axially adjusted within the oxidizer housing using a screw clamp mechanism or any other mechanical structure that allows the distance between the two ends of the fiber bundle to be increased or decreased.

Pressurized air is introduced to the interior of the tubular membrane and a spent liquid redox catalyst is allowed to contact the exterior of the membrane. The air diffuses through the small pores in the membrane and into the catalyst solution as extremely small bubbles having high surface areas, thus yielding high mass transfer rates. In one possible embodiment, a series arrangement of vessels containing bundles of hollow fiber membrane can be used to economically regenerate a spent liquid redox catalyst, thus providing an extremely economical method of treating a hydrogen sulfide containing gas stream, and consequently, reducing operating costs. Alternatively, the vessels containing hollow fiber membranes could be arranged in a parallel flow scheme.

In the typical process of converting $H_2S$ to elemental sulfur utilizing an aqueous redox solution containing a chelated iron catalyst, the $H_2S$ containing gas stream (sour gas) is contacted with the aqueous redox solution where the $H_2S$ is absorbed and converted to elemental sulfur and where a portion of the iron is reduced from the ferric state ($Fe^{+++}$) to the ferrous state ($Fe^{++}$). All or a portion of the redox solution containing the ferrous state iron is then introduced into one or more vessels containing bundles of hollow fiber membranes and contacts the outside of membrane. Compressed air is introduced to the interior of the membrane where it diffuses through the membrane wall and contacts the redox solution as very tiny bubbles having a high surface area. This causes the ferrous iron to regenerate back (oxidize) to the ferric state (regeneration step). Sulfur is removed from the system by passing a portion or all of the solution from the oxidizer through a sulfur recovery device, where the sulfur is removed from the process. Regenerated metal chelate catalyst solution is then returned (recycled) to the process to be used again to catalyze the oxidation of the $H_2S$.

Although a number of polyvalent metals can be used to formulate the metal chelate catalyst used in the process of this invention, a preferred polyvalent metal is iron. The series of reactions involved in catalytically oxidizing hydrogen sulfide to elemental sulfur using an iron chelate catalyst can be represented by the following reactions, where L represents the particular ligand chosen to formulate the metal chelate catalyst:

$$H_2S_{(gas)} + H_2O_{(liq.)} \rightarrow H_2S_{(aqueous)} + H_2O_{(liq.)} \quad (1)$$

$$H_2S_{(aqueous)} \rightarrow H^+ + HS^- \quad (2)$$

$$HS^- + 2(Fe^{3+}L_2) \rightarrow S_{(solid)} + 2(Fe^{2+}L_2) + H^+ \quad (3)$$

By combining equations (1) through (3) the resulting equation is:

$$H_2S_{(gas)} + 2(Fe^{3+}L_2) \rightarrow 2H^+ + 2(Fe^{2+}L_2) + S_{(solid)} \quad (4)$$

In order to have an economical workable process for removing hydrogen sulfide from a gaseous stream when a ferric iron chelate is used to effect catalytic oxidation of the hydrogen sulfide, it is essential that the ferrous iron chelate formed in the above described manner be continuously regenerated by oxidizing to ferric iron chelate on contacting the reaction solution with dissolved oxygen, preferably in the form of ambient air, in the same or in a separate contact zone. The series of reactions which take place in the oxidizer of our invention when regenerating the metal chelate catalyst can be represented by the following equations:

$$O_{2(gas)} + 2H_2O \rightarrow O_{2(aqueous)} + 2H_2O \quad (5)$$

$$O_{2(aqueous)} + 2H_2O + 4(Fe^{2+}L_2) \rightarrow 4(OH^-) + 4(Fe^{3+}L_2) \quad (6)$$

By combining equations (5) through (6), the resulting equation (7) is:

$$\tfrac{1}{2}O_2 + H_2O + 2(Fe^{2+}L_2) \rightarrow 2(OH^-) + 2(Fe^{3+}L_2) \quad (7)$$

And, when equations (4) and (7) are combined, the overall process can be represented by the following equation:

$$H_2S_{(gas)} + \tfrac{1}{2}O_{2(gas)} \rightarrow S_{(solid)} + H_2O_{(liq.)} \quad (8)$$

It has been found that not all iron chelating agents capable of forming a complex in aqueous solutions with iron in the ferric valence state ($Fe^{3+}$) or in the ferrous valence state ($Fe^{2+}$) are suitable for use over the broad range of operating conditions employed for this oxidation-reduction system for the removal of hydrogen sulfide. Among the iron chelate reagents which have been used in prior art processes for removing hydrogen sulfide are the aminopolycarboxylic acid-type chelating agents, such as ethylenediamine tetraacetic acid and the alkali metal salts thereof.

In oxidation-reduction processing systems where the oxidation step and regeneration step occur in completely separate vessels, sometimes called conventional systems, typically large amounts of excess air is needed to regenerate the spent redox catalyst solution. The present invention is intended to greatly reduce the amount of excess air needed.

Accordingly, one object of this invention is to provide an improved oxidizer design that uses a hollow fiber membrane to effect gas-liquid contact between air and a liquid redox catalyst solution.

Another object is to provide an improved iron-based, liquid redox process by using hollow fiber membrane technology to regenerate the spent iron-based catalyst solution.

The above-stated objects are accomplished by providing an oxidizer for liquid redox catalyst solutions comprising a housing having an upper portion and a lower portion and a cross-sectional area defining an interior portion; a bundle of hollow fibers having a cross-sectional area and an adjustably supported length within the interior portion of the housing, where each fiber has an inside passage that is accessed through first and second ends; a liquid inlet port located on the lower portion of the housing and a liquid outlet port located on the upper portion of the housing; at least one gas inlet located on either the upper or lower portions of the housing and in fluid communication with either the first or second ends of the bundle of hollow fibers; and a means for adjusting the length of the bundle of hollow fibers.

Another embodiment of our invention involves providing a system for oxidizing a liquid reduction-oxidation catalyst solution comprising a source of pressurized air; a hollow fiber membrane in fluid communication with the source of pressurized air; and an absorber vessel in fluid communication with the hollow fiber membrane. Our invention also is directed to a process for continuously oxidizing a liquid reduction-oxidation catalyst solution includes providing a contacting unit comprising a hollow fiber membrane having an interior and exterior; introducing a stream of pressurized air to the contacting unit; and introducing a liquid reduction-oxidation catalyst to the contacting unit such that the air contacts the catalyst.

Yet another embodiment of our invention relates to a process for continuously removing hydrogen sulfide from a gas where the gas feed is directed to the oxidation-reduction process where it is contacted with a chelated metal catalyst to produce a first hydrogen sulfide-free gas stream and a second stream comprising elemental sulfur and chelated metal catalyst solution; removing the first hydrogen sulfide-free gas stream from the process; providing a hollow fiber membrane having an interior and an exterior; directing at least a portion of the second stream to the exterior of the hollow fiber membrane; introducing a pressurized air stream into the interior of the hollow fiber membrane such that the air diffuses through the hollow fiber membrane and contacts the second stream; and separating elemental sulfur from the chelated metal catalyst solution.

These and other objects will become more apparent from the detail description of the preferred embodiment contained below.

DETAILED DESCRIPTION OF PREFERRED EMBODIMENTS

As stated, our invention concerns a novel oxidizer that can be used to regenerate a liquid redox catalyst solution. This oxidizer can be used to provide a new process flow scheme for the desulphurization of a sour gas. Critical to our invention is the use of membrane technology in the oxidizer to provide highly efficient and economical gas-liquid contact resulting in high mass transfer rates between air and the liquid catalyst solution. Conventional membranes have been used to support solid phase redox catalyst, for example, U.S. Pat. No. 4,455,236 teaches a waste water treatment process where dissolved hydrogen sulfide is converted to elemental sulfur. However, we are unaware of any membrane use in redox processes that involve liquid redox catalyst solutions to treat sour gas. The preferred membrane is a hollow fiber membrane that can be fabricated from polymers, metals, ceramics, glasses, carbon and other like materials that allows air to diffuse from inside the membrane to the outside. As the name implies, these hollow fibers are very small hollow tubes that work on the principle of diffusion of gases through very tiny pores in the membrane tubes. Such hollow fiber membranes have been employed in the past in a wide variety of industries including food, juice, pharmaceutical, metal working, dairy, wine, and water purification. Preferred membrane materials are polymers, specifically those selected from the group consisting of polypropylene, polyacrylonotrile, polysulfone and polyvinylidine difluoride. Membrane surface area per unit volume is an important specification with regard to hollow fiber membranes. The preferred surface area of the hollow fiber membranes of our invention should be within the range from about 5000 to about 30,000 $m^2/m^3$.

Figure 1:
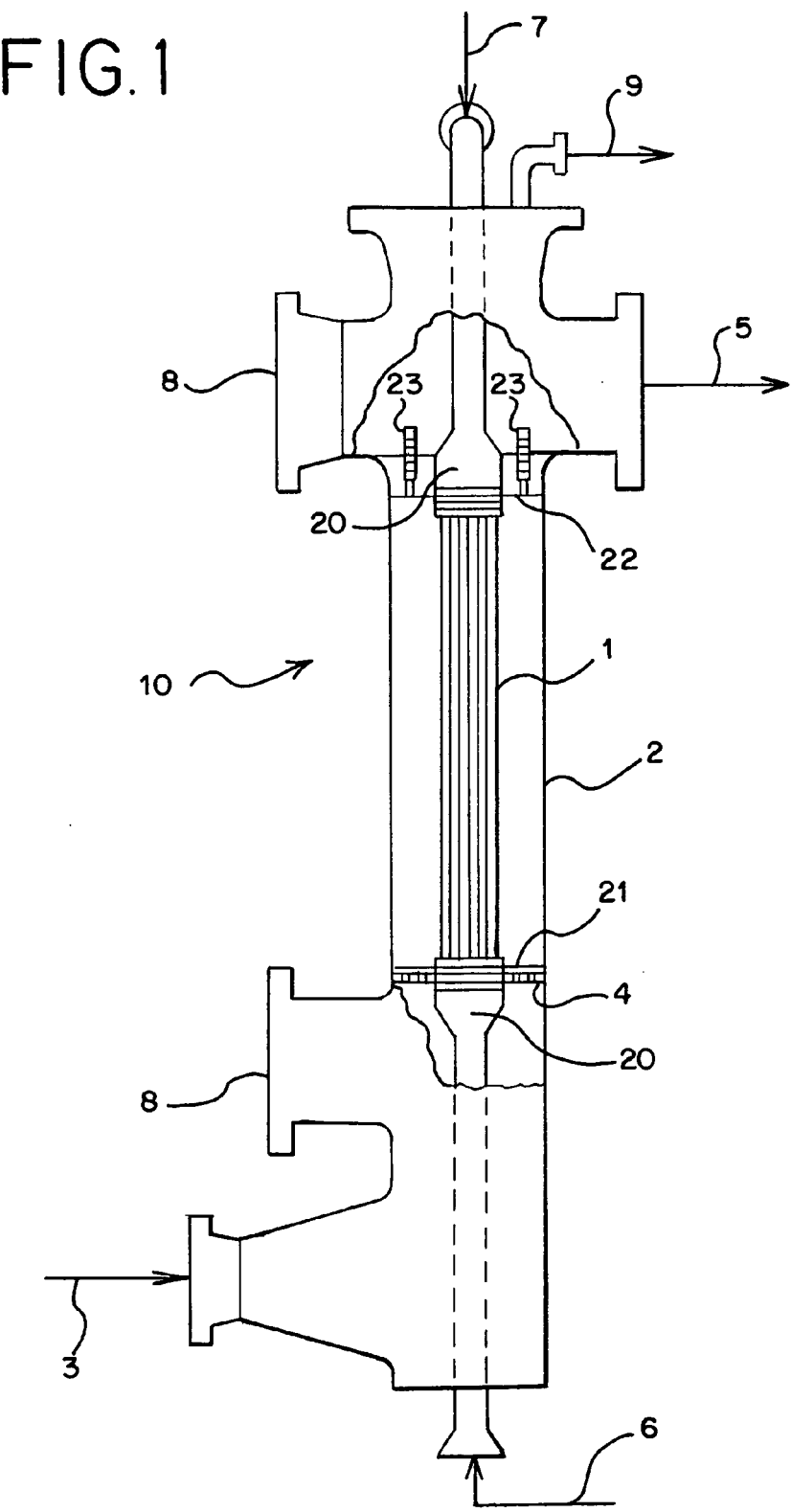
FIG. 1 schematically illustrates one possible embodiment of the oxidizer of our invention.

FIG. 1 shows one possible configuration of the oxidizer 10 of our invention that contains the hollow fiber membrane. A bundle of hollow fibers 1 is adjustably supported in vessel 2. Liquid redox solution enters vessel 2 through inlet line 3 and passes up flow through orifice plate 4. Although an orifice plate is shown in the figure, any device may be used that provides uniform up flow of the solution and that prevents channeling of the solution through the vessel. The solution flows over the exterior of the hollow fiber bundle 1, preferably at a flow rate in the turbulent flow regime, and exits the vessel through line 5. A pressurized air stream is supplied via lines 6 and 7 and is directed to the interior of the individual hollow fiber membranes. Alternative embodiments could possibly use just a single inlet for the air, in either an up flow or down flow configuration. Air is delivered to the interior of the hollow fiber membrane at a pressure of from about 15 to about 50 psig, more preferably from about 20–30 psig. Oxidizer 10 also may also have one or more access or maintenance ports shown as 8. Internally, the fiber bundle 1 is supported by end caps 20 and support brackets 21 and 22. As stated, in addition to the hollow fiber membrane, unique to our oxidizer is the ability to vary the length and thus the tension placed on the fiber bundle. This is accomplished by providing an adjustable support means such that the distance between end caps 20 can be varied to increase or decrease the tension placed on the fiber bundle. As shown in FIG. 1, one possible means to accomplish this adjustment is using adjusting screws 23 attached to a stationary support bracket 22. This combination of adjusting screws and bracket could be also located at the opposite end of the fiber bundle, or in some applications the adjustment means are located on both ends of the fiber bundle. The exact means used to vary the length or tension of the fiber bundle is not critical to our invention. Regardless of the means used to accomplish the adjustment in tension of the fiber bundle, the important feature is that the tension must be relaxed enough such that the turbulent flow of the liquid redox solution causes the fibers to move easily relative to each other, thus preventing sulfur from building up on and among the fibers, which will result in reducing or blocking liquid fluid flow. Reduced liquid flow causes operational problems and greatly reduces the air mass transfer rate.

Operating temperatures for the hollow fiber membrane range from about 25° C. to about 100° C., more preferably from about 30° to about 80° C. Because the air is introduced into the vessel at a pressure higher than the liquid redox solution, the air diffuses through the individual fibers as tiny bubbles and mixes with the liquid redox solution passing over the exterior of the bundles, thus oxidizing the redox catalyst solution. The oxidized or regenerated redox catalyst can then be recycled for further use. Any excess pressurized gas is removed from vessel 2 via line 9 or with the liquid redox solution exiting in line 5. Although FIG. 1 illustrates only one bundle of hollow fiber membrane in a single vessel, our invention covers the use of multiple vessels and multiple hollow fiber membrane bundles arranged in series or parallel flow configurations. The cross-sectional area of the housing is preferably greater than the cross-sectional area of the fiber bundle, preferably at least two times greater. By having the cross-sectional area of the housing greater than the fiber bundle allows the fibers to billow or expand into the housing volume during operation. This assists in preventing plugging by the solid sulfur particles.

Figure 2:
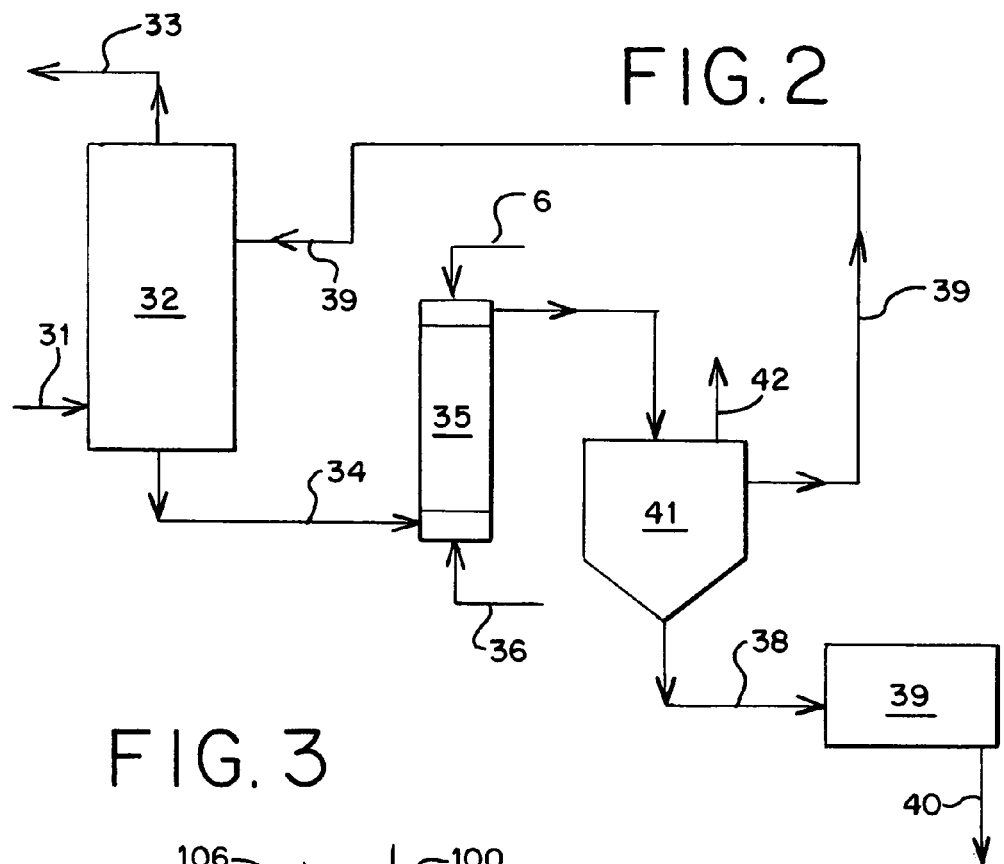
FIG. 2 schematically illustrates a desulphurization process flow scheme for one possible embodiment of this invention.

As mentioned, the oxidizer of our invention can be incorporated into a desulphurization process. FIG. 2 schematically illustrates such a desulphurization process 30 for treatment of gas streams contaminated with $H_2S$. As shown, a waste gas stream (sour gas) is delivered via feed line 31 to an absorber 32 where it is contacted with an aqueous chelated iron catalyst solution. This solution is obtained from vessel 41 that operates as a degassing unit or in some circumstances as a combination of a settler and degasser. After contacting the feed gas with the liquid redox solution in absorber 32, the spent liquid catalyst solution is removed via line 34 and supplied to the inlet of oxidizer 35 that contains a hollow fiber membrane. The absorber 32 may be of any suitable design to meet the required amount of $H_2S$ removal, i.e. liquid full absorbers, static mixers, packed columns, venturis or mobile bed absorbers. A gas stream, substantially free of $H_2S$, leaves the absorber 32 via line 33. An $O_2$ containing gas stream, preferably air, is introduced into oxidizer 35 via lines 36. The oxidized liquid redox solution is removed from oxidizer 35 through line 37 and introduced into vessel 41. The elemental sulfur is continuously removed from the process by sending a portion of the liquid solution from vessel 41 via stream 38, to a sulfur recovery device 39. All or a portion of the oxidized and regenerated aqueous catalyst solution is returned to the absorber via line 39, while the recovered sulfur 40 is either sold or sent to disposal. Oxidation of the ferrous chelate to the ferric chelate occurs in oxidizer 35, which is accomplished by supplying an air stream via lines 36 to the interior of the hollow fiber membrane, where it diffuses into the liquid redox catalyst solution passing over the exterior of the membrane. Excess air from the oxidizer is removed from the process via stream 42.

The invention thus far has been described with particular emphasis on the use of iron as the polyvalent metal of choice; however, other polyvalent metals that form chelates with the ligands described above can also be used. Such additional polyvalent metals include copper, cobalt, vanadium, manganese, platinum, tungsten, nickel, mercury, tin and lead. The chelating agents are generally of the aminopolycarboxylic acid family such as EDTA, HEDTA, MGDA and NTA, or others any one of which can be used in connection with this invention.

In all liquid oxidation-reduction systems, some form of alkaline material must be added to the system to control the pH of the solution. Without the addition of the alkaline material, the pH of the solution will slowly decrease until absorption of $H_2S$ into the solution is no longer great enough to meet the required $H_2S$ removal efficiencies. This decrease in pH is due to the acidic nature of $H_2S$. In addition, if the gas stream being processed contains other acidic species such as carbon dioxide, the pH will decrease even more quickly than with just $H_2S$. Consequently, alkaline materials such as NaOH, KOH, ammonia, alkali metal carbonates, or bicarbonates are generally added to the system to neutralize the acidic components. These materials are generally added to the bulk solution contained in the oxidizer; however, they can be added anywhere in the process.

Figure 3:
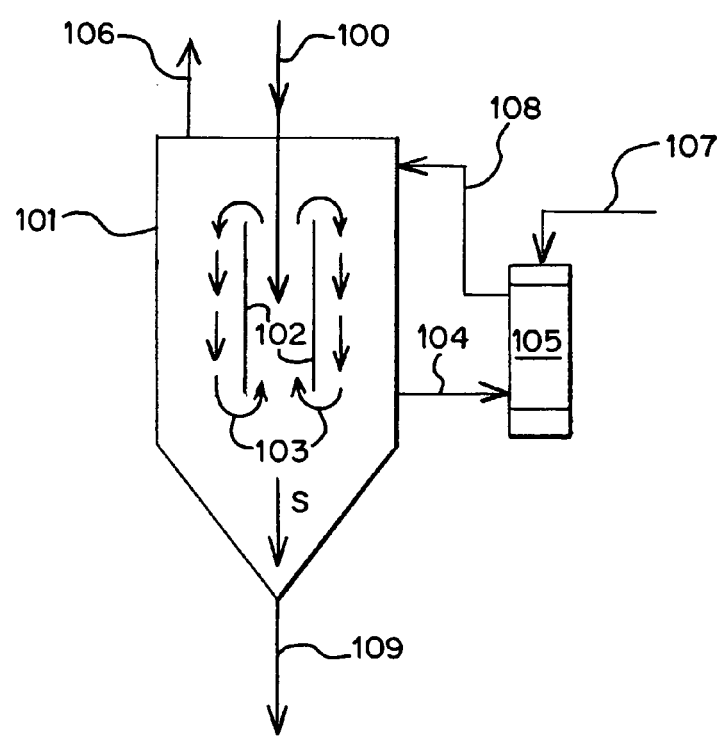
FIG. 3 schematically illustrates one possible auto-circulation desulphurization process flow scheme of this invention.

Although the above description was directed to a conventional desulphurization process, the oxidizer of our invention could be incorporated and used with what is known in the art as the "auto-circulation" desulphurization process which is exemplified in FIG. 3, where a waste gas stream (sour gas) is delivered via feed line 100 to vessel 101 that operates both as an absorber and catalyst regeneration vessel. The waste gas is introduced between at least two baffles 102 where it contacts with an aqueous chelated iron catalyst solution that is circulated within vessel 101 as indicated by directional arrows 103. Although two baffles are shown, it is within the scope of our invention that multiple sets of baffles, or circular pipe sections, or contacting zones (centerwells) could be used. After contacting the feed gas with the liquid redox solution in vessel 101, the spent liquid catalyst solution is removed via line 104 and supplied to the inlet of oxidizer 105 that contains a hollow fiber membrane. The particulars of the oxidizer would be the same as described above. A gas stream, substantially free of hydrogen sulfide leaves vessel 101 via line 106. The oxidized liquid redox solution is removed from oxidizer 105 through line 108 and re-introduced into vessel 101. Elemental sulfur settles out in direction S and is continuously removed from the process by removing a portion of the liquid solution from vessel 101 via stream 109, where it can be further processed to recover solid sulfur for sale or disposal. Oxidation of the ferrous chelate to the ferric chelate occurs in the oxidizer 105, which is accomplished by supplying an air stream via lines 107 to the interior of the hollow fiber membrane, where it diffuses into the liquid redox catalyst solution passing over the exterior of the membrane. Circulation of catalyst solution between compartments is achieved by virtue of an "air-lift" created by the differential solution densities in the oxidizer, the absorber, and the outer vessel 101 due to the differing aeration rates within each chamber.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

We claim:

1. A process for continuously oxidizing a liquid reduction-oxidation catalyst solution comprising the following steps in combination:
   a. providing a contacting unit comprising a hollow fiber membrane having an interior and exterior;
   b. introducing a stream of pressurized, oxygen containing gas to the contacting unit; and
   c. introducing a liquid reduction-oxidation catalyst to the contacting unit such that the oxygen contacts the catalyst.

2. The process of claim 1 further characterized in that the pressurized, oxygen containing gas is directed to the interior of the membrane and the liquid reduction-oxidation catalyst is directed to the exterior of the membrane.

3. The process of claim 1 where the liquid reduction-oxidation catalyst is a chelated metal solution.

* * * * *